(12) United States Patent
Steckel et al.

(10) Patent No.: US 8,924,097 B2
(45) Date of Patent: Dec. 30, 2014

(54) METHOD AND SYSTEM FOR HARVESTING AND ENSILAGE OF FEED MATERIAL

(71) Applicant: CLAAS Selbsfahrende Erntemaschinen GmbH, Harsewinkel (DE)

(72) Inventors: Thilo Steckel, Guetersloh (DE); Ludger Hugenroth, Ostbevern (DE); Hans-Peter Grothaus, Bielefeld (DE); Christian Schaeperkoetter, Bielefeld (DE); Ivan Smolnik, Harsewinkel (DE); Max Reinecke, Versmold (DE); Christian Rusch, Harsewinkel (DE); Christiane Stricker, Warendorf (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 133 days.

(21) Appl. No.: 13/669,701

(22) Filed: Nov. 6, 2012

(65) Prior Publication Data
US 2013/0177670 A1 Jul. 11, 2013

(30) Foreign Application Priority Data
Nov. 8, 2011 (DE) .......................... 10 2011 117 860

(51) Int. Cl.
*B62D 61/10* (2006.01)
*A01D 43/00* (2006.01)
*A23K 1/00* (2006.01)
*A01F 25/18* (2006.01)
*A01D 43/08* (2006.01)
*A01D 93/00* (2009.01)

(52) U.S. Cl.
CPC ............... *A23K 1/001* (2013.01); *A01F 25/183* (2013.01); *A01D 43/085* (2013.01); *A01D 93/00* (2013.01)
USPC ........................................................ 701/50

(58) Field of Classification Search
USPC ..................... 37/348; 172/2–11; 701/50, 102, 701/110–115, 101, 105; 123/350, 352, 123/41.11, 41.12; 477/43, 47, 406
See application file for complete search history.

(56) References Cited

U.S. PATENT DOCUMENTS 6,959,241 B2 * 10/2005 Itow et al. ...................... 701/102
7,373,239 B2 * 5/2008 Kamado et al. ............... 701/103
8,068,970 B2   11/2011 Hugenroth et al.

FOREIGN PATENT DOCUMENTS

DE       10 2008 020 497       11/2009

\* cited by examiner

*Primary Examiner* — Robert Pezzuto
(74) *Attorney, Agent, or Firm* — Michael J. Striker

(57) ABSTRACT

Plant material for ensilage is harvested using at least one harvesting vehicle in the field, is hauled to a silo and is compressed using a compression device. The compression output of the compression device is compared to the harvesting output of the at least one harvesting vehicle, and a command to increase the harvesting output or to decrease the harvesting output of the harvesting vehicle (1) to a non-vanishing value is generated when the harvesting output deviates significantly from the compression output.

13 Claims, 2 Drawing Sheets

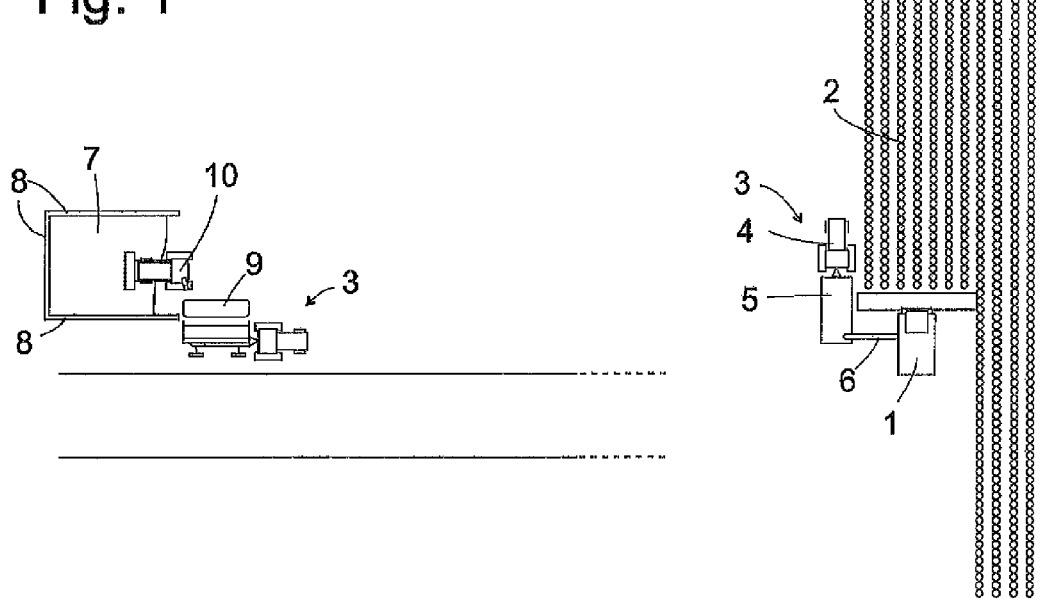
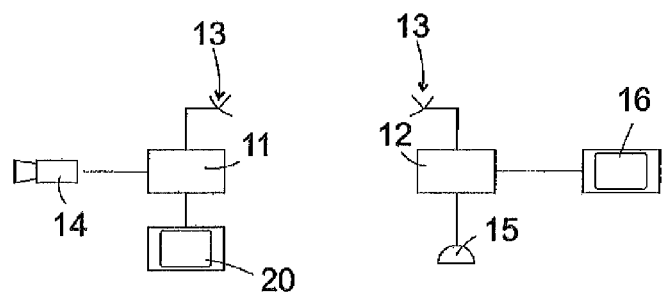

METHOD AND SYSTEM FOR HARVESTING AND ENSILAGE OF FEED MATERIAL

CROSS-REFERENCE TO A RELATED APPLICATION

The invention described and claimed hereinbelow is also described in German Patent Application DE 10 2011 117 860.4 filed on Nov. 8, 2011. This German Patent Application, subject matter of which is incorporated herein by reference, provides the basis for a claim of priority of invention under 35 U.S.C. 119(a)-(d).

BACKGROUND OF THE INVENTION

The invention relates to a method for creating feed material, for example, feed for silage, a system of machines for creating feed material and a control unit for use in a system for creating feed material.

To harvest plant material intended for use as animal feed, forage harvesters are typically used that fragmentize the plant material, such as corn, beets or the like, already on the field. The chopped material obtained in this manner is transported to a silo, where it is compressed, for example, by being driven over repeatedly by a tractor. The plant material (compressed) is subsequently wrapped with an air-tight film in order to minimize contact of the plant material with atmospheric oxygen and thereby create suitable conditions for lactic fermentation. Lactic fermentation preserves the plant material and inhibits the growth of mold and other harmful organisms. Rapid processing of the plant material, which minimizes contact with atmospheric oxygen, is highly significant for the quality of the feed for silage created in this manner. Poor coordination of the processing chain, in which harvesting output is greater than compression output, results in chopped plant material in contact with atmospheric oxygen lying in a heap at the silo before it can be compressed.

In most harvesting vehicles available today, the engine is operated continuously at full output during field work, and the distribution of this output to the ground drive and chopping assembly is variable. The power requirement of the chopping assembly depends on the length of cut required for the further processing of the plant material at the silo and on the mass flow of the plant material. The mass flow of the plant material is proportional to the stand density of the plant material on the field and the ground speed of the harvesting machine. The mass throughput of the plant material in the harvesting machine is therefore not an arbitrarily controllable variable.

If the harvesting output is reduced by decreasing the number of harvesting vehicles used, it can be ensured that the chopped plant material can be compressed at the same rate at which it is delivered to the silo. Consequently, times will then occur at which the compression vehicle has nothing to do or operates unproductively, which unnecessarily increases the costs of feed production.

German patent application DE 10 2008 020 497 A1 makes known a harvesting vehicle that provides the driver with the option of varying the engine output during field work by switching between various characteristic curves. For example, in situations in which the throughput of crop is low or not present, and it is not possible or worthwhile to apply the full engine output to the ground drive (e.g., during turning maneuvers), the driver can reduce the engine output and thereby save fuel. During harvesting operation, however, the driver of such a vehicle also is required to operate as productively as possible. Operating as productively as possible might be characterized as harvesting the largest area possible in the shortest amount of time and to therefore operate the engine at the greatest useful output that is appropriate therefor.

SUMMARY OF THE INVENTION

The present invention overcomes the shortcomings of known arts, such as those mentioned above.

In one aspect, the present invention provides methods and means that make cost-effective production of high-quality feed for silage possible.

In an embodiment, the invention provides a method for creating feed material, in which, using at least one harvesting vehicle, plant material is harvested on the field, and the plant material is transported to a silo and is compressed using a compression device such as a compression vehicle. The method also includes comparing the compression output of the compression device to the harvesting output of the at least one harvesting vehicle and adapting the harvesting output of the at least one harvesting vehicle to the compression output of the compression device.

As such, the rate at which the plant material is delivered at the silo is adapted exactly to the compression output. Unnecessary contact of the plant material with atmospheric oxygen before compression is therefore prevented, as is inadequate compression. Inadequate compression results when attempts are made to compress excessive quantities of plant material at once or when compression is not carried out with the necessary diligence. Furthermore, by adapting the harvesting output of the at least one harvesting machine to the compression output, a harvesting chain that is improved with respect to logistics is created in that congestion situations in front of the silo are prevented.

Advantageously, the harvesting output is adapted by generating a command to increase or decrease the harvesting output of the harvesting vehicle when the harvesting output deviates significantly from the compression output. If the harvesting output corresponds to the compression out, within a definable tolerance, the harvesting output is advantageously retained, i.e. adaptation is not necessary in this case. The harvesting output is adapted to a value that does not vanish, i.e. the harvesting machine always delivers a harvesting yield that is at least greater than zero, in order to ensure that harvesting operation is continuous.

In order to also ensure cost-effective use of fuel in feed production, the adaptation of the harvesting output includes adaptation of the output of the drive engine of the harvesting vehicle.

Particularly efficient operation is possible when the adaptation of the output includes switching between various operating states of the engine that differ according to the output-engine speed characteristic curve thereof, as described more particularly in DE 10 2008 020 497 A1.

The harvesting output is estimated on the basis of the quantity of plant material to be compressed at the silo, wherein the harvesting output is adapted in particular when a long-term trend in the development of this quantity is identified.

In the simplest case, estimation is based on optical detection, more particularly on photographic detection of the volume of plant material using a camera. If, for example, a fresh load of plant material is delivered before a previously delivered load has been fully compressed, this indicates that the compression output is inadequate and the harvesting output should be reduced. Additional information such as the current plant material throughput at the harvesting vehicle, and plant material throughputs that took place in the past also can be taken into consideration.

The camera can advantageously be mounted on the compression vehicle in order to detect, from different directions and following the movements of the compression vehicle, the quantity of plant material to be compressed in order to permit a better estimation of the volumes of plant material.

Although relatively dense crop such as chopped corn or beet material is naturally suited to be piled up at the silo adjacent to material that has already been compressed and, from there, to be moved to the silo and compressed using the compression vehicle, this is not the case with cut grass. In the case of cut grass, it is common to layer fresh material to be compressed from a hauling vehicle directly onto compressed material already in the silo, in order to compress it on the spot. It is then difficult to estimate the volume of the crop to be compressed using photographic methods since the thickness of the layer cannot be reliably determined. Instead, the expansion of a surface covered with the plant material to be compressed can be estimated. Plant material can advantageously be assessed as fully compressed when a compression vehicle has driven over a unit of surface area covered with said plant material a predefined number of times.

To ensure that the plant material can be compressed in a short amount of time and using little fuel, the traversable surface of the silo is subdivided into a plurality of surface units. For each surface unit, the number of traverses is recorded. Doing so permits rarely traversed surface units to be identified and which should preferably be traversed in order to obtain uniform compression on the entire surface of the silo.

If plant material to be compressed is unloaded at the silo in loads, the weight of each load is reported to a control unit performing the above-described procedure in order to enable the control unit to relate the quantity of crop to be compressed to a mass flow of the crop detected at the harvesting vehicle. The quantity of crop to be compressed is that which is present at the silo, and which can be substantially estimated as described above on the basis of the volume or surface area thereof.

Since the silo to which the plant material is transported is typically far from the field on which it is loaded, at least one hauling vehicle is usually used in addition to the at least one harvesting vehicle and compression vehicle. The plant material is transferred to the hauling vehicle to be hauled to the silo. In this case, it is advantageous when the control unit also estimates the hauling output, compares the compression output to the hauling output and adapts the hauling output, e.g. by specifying a hauling speed if the hauling output deviates significantly from the compression output.

For example, prolonged inactivity of the compression vehicle due to absence of plant material can be avoided, and the plant material can be hauled slowly, in an energy-saving manner, in order to delay the arrival thereof at the silo, if an adequate amount of material to be processed is already present there.

In an embodiment, the invention provides a control unit for carrying out the above-described method. The control unit comprises means for comparing the compression output and a communication interface for transmitting t least one command to increase or decrease the harvesting output to the harvesting vehicle. The invention also provides a computer program product having program code means, the program code means preferably embedded within a computer readable medium. The program code means enable a computer, preferably a fieldwork computer of the compression vehicle, to implement the above-described procedure (method) or to function as a control unit when the computer executes same.

BRIEF DESCRIPTION OF THE DRAWINGS

Further features and advantages of the invention will become apparent from the description of embodiments that follows, with reference to the attached figures, wherein:

FIG. 1 shows a schematic depiction of an application situation of the invention;

FIG. 2 shows a block diagram of components of the vehicles from FIG. 1 within the scope of the invention;

DETAILED DESCRIPTION OF THE PREFERRED EMBODIMENTS

Figure 3:
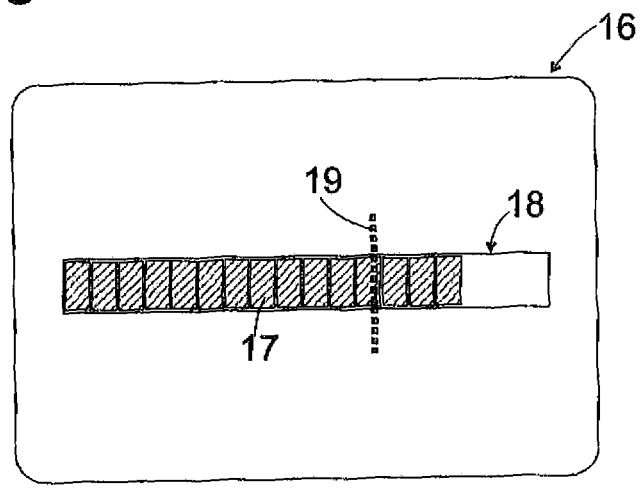
FIG. 3 shows a schematic view of a display image on a display instrument of the harvesting or hauling vehicle.

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives failing within the spirit and scope of the present invention, as defined by the appended claims.

FIG. 1 shows a schematic depiction of a typical application situation of the present invention. A harvesting vehicle, which is a forage harvester 1 in this case, is engaged in harvesting a plant crop 2 on a field. The forage harvester 1 is accompanied by a hauling vehicle 3, which is a tractor 4 having a trailer 5 in this case. By way of an upper discharge chute 6, the forage harvester 1 continuously transfers chopped plant material to the trailer 5.

When the load capacity of the hauling vehicle 3 is reached, it is driven to a horizontal silo 7. At this point in time, a second hauling vehicle should be waiting on the field to assume the position under the upper discharge chute 6 so that the forage harvester 1 can continue working without interruption while the loaded hauling vehicle 3 travels to the horizontal silo 7.

The horizontal silo 7 comprises, in a manner known per se, a concrete slab on which three walls 8 are connected to one another at right angles. The hauling vehicle 3 discharges its load onto a pile 9 adjacent to the horizontal silo 7. A compression vehicle, which is a tractor having a loading shovel in this case, removes plant material from the pile 9, distributes it in the space between the walls 8 and drives over the plant material that has already been unloaded there. A silo filling that is dense and substantially free of enclosed air is therefore obtained. Once the silo 7 has been completely filled, the silo filling can be covered in an air-tight manner and allowed to ferment.

A fieldwork computer of the compression vehicle 10 functions as the central control unit 11 (see FIG. 2) for the method according to the invention. As should be apparent to the skilled artisan, however, some of the tasks of said control unit 11 described in the following can also be carried out equally well by a fieldwork computer 12 of the harvesting vehicle 1 or the hauling vehicle 3.

Every time a load of plant material arrives at the silo 7, the control unit 11 receives information on the mass of the load via a wireless interface 13. This information can originate from the fieldwork computer of the hauling vehicle 3, for example, and can specify a nominal load capacity of the trailer 5. Preferably, the fieldwork computer 12 of the harvesting vehicle 1 is connected to a sensor 15 for detecting the mass flow of the plant material in the harvesting vehicle 1 and determines the weight of the load by integrating the mass flow over the period of time required to load the trailer 5 and transmit it wirelessly to the control unit 11. Since the distance between the harvesting vehicle 1 and the compression vehicle 10 can be further than the range of the wireless interfaces 13 thereof, the two may communicate with each other over a public wireless network.

The control unit 11 is connected to a camera 14 mounted on the compression vehicle 10 in order to receive images of the pile 9 from the camera. While the compression vehicle 10 moves on the horizontal silo 7 in order to compress the crop therein, the camera 14 records the pile 9 from different perspectives, thereby enabling the control unit 11 to calculate the three-dimensional shape or volume thereof on the basis of the various images of the pile 9. Based on the knowledge of the reported mass of the load that formed the pile 9, the control unit 11 estimates the density of the plant material in the pile 9. On the basis of the density, the control unit estimates the remaining mass of the pile 9 at any time, even if a portion of the material contained therein was pushed off and distributed and compressed on the silo 7, and estimates the compression output in this manner.

An important task of the control unit 11 is that of comparing the harvesting output of the harvesting vehicle 1 to the compression output of the compression vehicle 10, in order to initiate an adaptation of one to the other if necessary. In an embodiment, the control unit 11 estimates the mass of the pile 9 immediately before every delivery of a new load and determines that the harvesting output is greater than the compression output when the mass increases from one load to the next.

It is also possible to determine, on the basis of images of the pile 9 delivered by the camera 14, the mass that the pile 9 loses by material being pushed toward the silo 7, and to divide the mass by the time that the compression vehicle 10 requires to distribute and compress said material on the silo 7. Compression output determined in this manner can be compared directly to the harvesting output measured by the harvesting vehicle 1 and reported to the control unit 11 via the wireless interfaces 13 or, in the case of simultaneous use of a plurality of harvesting vehicles 1, can be compared to the sum of the harvesting outputs thereof.

If the result of a comparison of harvesting output and compression output is that the compression output remains behind the harvesting output, the control unit 11 sends a command via the wireless interfaces 13 to the fieldwork computer 12 of the harvesting vehicle 1 to reduce the harvesting output. The extent of the reduction can be specified in the command. The extent of the reduction also can be fixedly specified. In the latter case, the command is transmitted as often as necessary in order to adapt the harvesting output to the compression output.

The fieldwork computer 12 may be configured or programmed to control the output of the engine of the harvesting vehicle 1 directly on the basis of such a command.

Alternatively, the fieldwork computer 12 may be configured only to control a display unit 16 at the console of the harvesting vehicle 1 on the basis of the command. An exemplary display image of the display unit 16 is shown in FIG. 3, wherein a variable-length bar 17 on a scale 18 shows the mass flow of the plant material currently detected by the sensor 15. When the bar 17 fills the entire scale 18, this corresponds to the maximum plant material flow that can be achieved by the harvesting vehicle 1. A mark 19 on the scale 18 shows the plant material flow specified in a command of the control unit 11 that should be set in order to adapt the harvesting output to the compression output. The driver can be alerted when such a command is received, for example by way of an acoustic signal, flashing of the mark 19 or the like.

The driver of the harvesting vehicle 1 has the option and responsibility of deciding whether to follow the command from the control unit 11. The commands delivered by the control unit 11 enable him to exactly regulate the engine output of the harvesting vehicle 1 at any time in such a way that harvesting is not carried out faster than the rate at which crop delivered at the silo 7 can be compressed. It is therefore possible to minimize the time that passes between the harvesting of the plant crop 2 and the compression at the silo 7.

If the stand has already been harvested and is on the hauling vehicle 3 underway to the silo 7, the control unit 11 issues relevant commands to the hauling vehicle 3 to trigger it to control its speed in such a way that the load arrives at the silo 7 exactly when the previous load has been processed and the compression of the new load can be started immediately. The current speed and a setpoint speed specified by the control unit 11 are displayed to the driver of the hauling vehicle 3 via a display image similar to that shown in FIG. 3.

Since the driver of the hauling vehicle 3 cannot always respond completely to the speed requests from the control unit 11, in particular when traveling on public routes, the control unit 11 also signals to the hauling vehicle 3 a desired arrival time at the silo 7 instead of the speed, or in addition thereto. The control unit 11 is also able to monitor the travel of the hauling vehicle from the field to the silo 7 on the basis of position data continuously delivered by the hauling vehicle, e.g. GPS data, and to continuously update the desired speed of the hauling vehicle 3 while it is underway.

Figure 4:
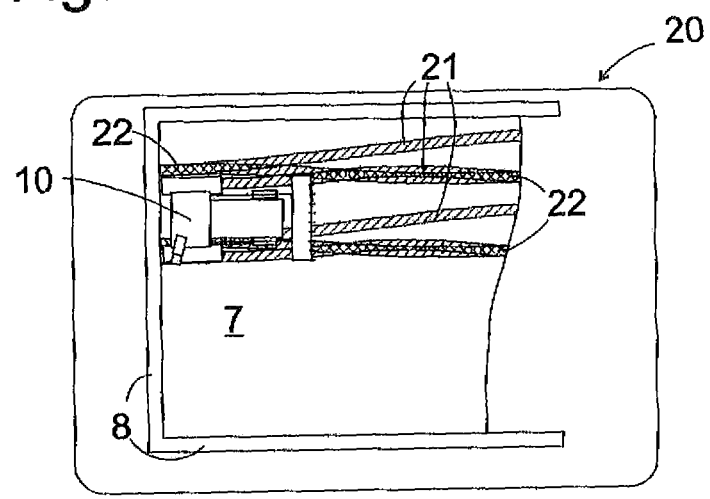
FIG. 4 shows a display image on a display instrument of the compression vehicle.

The control unit 11 also uses GPS data to determine the position of the compression vehicle 10 and depict it relative to the silo 7 on a display unit 20 of the compression vehicle 10, as shown in FIG. 4. On the basis of continuously received GPS data (for example, supported by monitoring steering wheel motions of the compression vehicle 10), the control unit 11 tracks the route covered by the compression vehicle 10 at the silo 7 and displays it on the display unit 20. During display, the color used to depict a section of the silo surface depends on how often it has been traversed since the last distribution of fresh crop on the silo surface.

In the depiction shown in FIG. 4, individual wheel tracks resulting on the silo surface due to the back-and-forth travel are visible. Regions 21 traversed once are shaded once and regions 22 traversed twice are shown with hatched shading. The driver can therefore view the display unit 20 and recognize at any time where he must steer the compression vehicle 10 in order to obtain adequate and homogeneous compression (i.e., an even minimum number of traverses) on the entire surface of the silo 7.

The fieldwork computer 11 of the compression vehicle 10 also is configured to actively intervene in the steering of the compression vehicle in order to steer the compression vehicle 10 (on the basis of the data collected on the previous movement of the compression vehicle 10), specifically to those regions of the silo surface that have not yet been traversed often enough to be adequately compressed.

As soon as this predefined minimum number of traverses on the entire surface (possibly apart from a predefined remaining percentage) has been reached, the driver is alerted. The driver is alerted by way of an acoustic signal, for example, that it is time to obtain fresh crop from the pile 9 and move it toward the silo 7. As soon as this takes place, the counting of the traverses on the entire surface of the silo 7 is reset and restarted.

For certain types of crop, more particularly cut grass, it is advantageous to not unload the crop from the hauling vehicle onto the pile 9 adjacent to the silo 7, but rather to distribute it directly from the hauling vehicle 3 on the silo surface. Since there are no piles that are separate from the silo 7, the compression output cannot be estimated on the basis of the decrease in size thereof. The compression output is estimated, however, before the delivered load has been fully compressed. To this end, a camera 14 is first used to determine, immediately after the load has been unloaded at the silo 7, which regions of the silo surface are covered by the fresh crop and, the surface content of the freshly covered areas is estimated.

Next, as described with reference to FIG. 4, the route covered by the compression vehicle 10 at the silo 7 is tracked and the portion of completely compressed surfaces (i.e., surfaces that have been traversed the specified number of times), on the previously estimated surface of the freshly covered regions is determined. On the basis of the ratio of the surfaces and the mass of the most recent load, which was transmitted to the control unit 11 from the hauling vehicle or the harvesting vehicle, the compression output is estimated and the result can be compared to the harvesting output.

The following list of reference signs of various elements mentioned above is included (as follows), for ease of explanation:

REFERENCE CHARACTERS

1 harvesting vehicle, forage harvester
2 plant crop
3 hauling vehicle
4 tractor
5 trailer
6 upper discharge chute
7 horizontal silo
8 wall
9 pile
10 compression vehicle
11 control unit
12 fieldwork computer
13 wireless interface
14 camera
15 mass flow sensor
16 display unit
17 bar
18 scale
19 mark
20 display unit
21 1st traversed region
22 2nd traversed region As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A method for creating feed material using at least one harvesting vehicle configured with a fieldwork computer connected to a sensor, a compression vehicle configured with a camera and a central control unit, comprising steps of:

transporting plant material harvested from a field to a silo using the at least one harvesting vehicle;

using the sensor and fieldwork computer to detect a mass flow of plant material in the harvesting vehicle;

using the camera to record images of a pile with harvested plant material to be compressed and compressing the plant material in the silo using the compression vehicle;

using the central control unit, estimating a quantity of plant material to be compressed at the silo by calculating a three dimensional shape or volume of the pile based on the images of the pile recorded by the camera, prior to delivery of a new load of plant material;

using the fieldwork computer, calculating a weight of the harvested plant material as a harvesting output and sending the calculated weight to the central control unit;

comparing the quantity of plant material to be compressed at the silo to the weight of the harvested plant material; and adapting the harvesting output of the at least one harvesting vehicle to the quantity of the plant material to be compressed at the silo by sending a command from the central control unit to the harvesting vehicle or the compression vehicle and vice versa.

2. The method according to claim 1, wherein the step of adapting includes adapting an output of a drive engine of the harvesting vehicle.

3. The method according to claim 2, wherein the step of adapting includes switching between various operating states of the drive engine, which operating states differ according to an output-engine speed characteristic curve thereof.

4. The method according to claim 1, further comprising estimating the harvesting output based on a quantity of the plant material to be compressed at the silo and adapting the harvesting output when a long-term trend in a development of the quantity is identified.

5. The method according to claim 4, wherein the estimating includes detecting a volume of the quantity photographically using the camera of the compression vehicle.

6. The method according to claim 4, wherein the estimating includes estimating a surface covered with the plant material to be compressed.

7. The method according to claim 1, further comprising assessing the plant material as compressed when the compression vehicle has driven over a surface unit covered with the plant material to be compressed a predefined number of times.

8. The method according to claim 7, wherein a traversable surface of the silo is subdivided into a plurality of surface units and wherein a number of drive over traverses is recorded for each surface unit.

9. The method according to claim 1, further comprising discharging plant material to be compressed at the silo in loads and reporting a weight of each load.

10. The method according to claim 1, wherein the harvesting output is estimated on the basis of a mass flow of the plant material at the harvesting vehicle.

11. The method according to claim 1, wherein in order to be hauled to the silo, the plant material is transferred from the at east ore harvesting vehicle to at least one hauling vehicle, including steps of:

estimating a hauling output;

comparing the compression output of the compression device to the hauling output; and adapting the hauling output if the hauling output is determined to deviate from the compression output.

12. The method according to claim 1, wherein the compression device is a compression vehicle.

13. A control unit for carrying out the method according to claim 1, comprising:
   means for comparing the compression output, and
   a communication interface for transmitting at least one command to the harvesting vehicle to increase or decrease the harvesting output.

\* \* \* \* \*